UNITED STATES PATENT OFFICE.

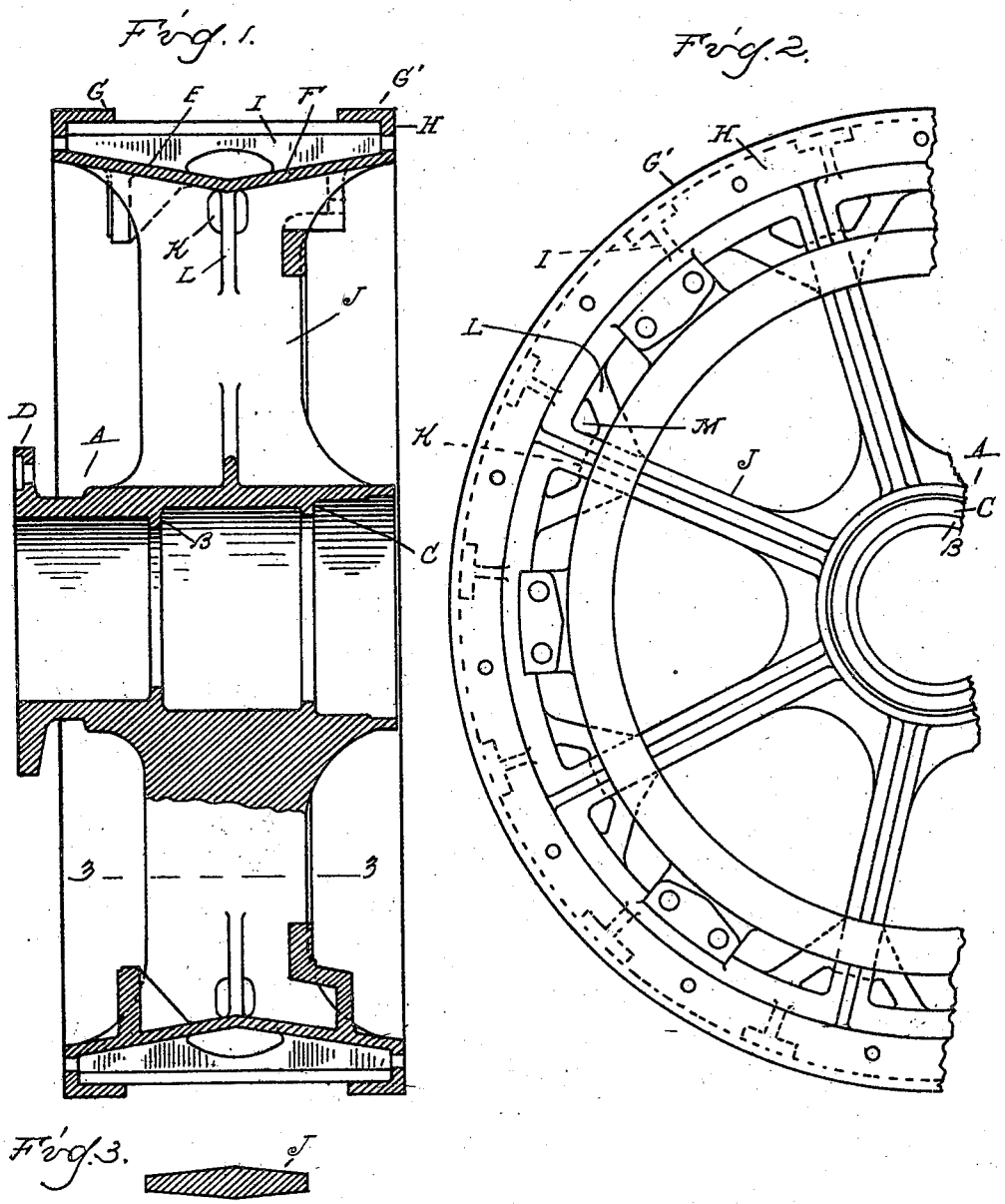

WALTER S. ALLEN, OF DETROIT, MICHIGAN, ASSIGNOR TO DETROIT STEEL CASTING COMPANY, OF DETROIT, MICHIGAN, A CORPORATION OF MICHIGAN.

CAST VEHICLE-WHEEL.

1,353,819.  Specification of Letters Patent.  Patented Sept. 28, 1920.

Application filed April 23, 1919. Serial No. 292,184.

*To all whom it may concern:*

Be it known that I, WALTER S. ALLEN, a citizen of the United States of America, residing at Detroit, in the county of Wayne and State of Michigan, have invented certain new and useful Improvements in Cast Vehicle-Wheels, of which the following is a specification, reference being had therein to the accompanying drawing.

The invention relates to cast vehicle wheels, being particularly designed for use on motor trucks and similar vehicles, and it is the object of the invention to obtain a simple construction which may be cast with the use of comparatively few baked sand cores and which is free from objectionable strains incident to the cooling and contraction of the metal. To this end the invention consists in the construction as hereinafter set forth.

In the drawings:

Figure 1 is a section through the wheel in the plane of the axis thereof;

Fig. 2 is a side elevation, partly in section;

Fig. 3 is a cross-section through one of the spokes on line 3—3 of Fig. 1.

A is a hub which is of a simple barrel form, being provided with internal shoulders B and C for receiving the end thrust from the bearings. It may also be provided with a flange D at one end for attachment to the driving shaft. E is a hollow rim having a continuous inner wall F and flaring outwardly from opposite sides of the central plane of the wheel. The outer peripheral wall of the rim is formed from flanges G and G' which project inwardly from the side walls H thereof, leaving an open channel therebetween which is bridged at intervals by cross braces I, which as shown are of T-shaped section. J are spokes extending radially from the hub to the rim and of a solid cross-section which tapers from the central plane of the wheel toward the opposite sides. At the point of intersection of the outer ends of the spokes with the inner wall of the rim the central portion is cut away, as indicated at K, so as to reduce the mass of metal. This is an important feature, for any concentrated mass of metal will be slower in cooling than other portions and will result in setting up strains in the finished wheel. On the other hand, where the spoke is cut away centrally in its thickest portion the mass of metal is so reduced as to avoid such a result.

To strengthen the connection between the spokes and the rim, brace flanges L may be arranged upon opposite sides of the spoke, extending diagonally in the central plane of the wheel from the spoke to the rim. These brace flanges are also preferably cut away at the angle of intersection between the spoke and rim, as indicated at M, this also being for the purpose of avoiding a concentrated mass of metal.

A wheel of the construction described may be easily cast, as the tapering form of the spokes, as well as the flaring form of the inner wall of the rim will provide abundant draft and will enable the casting of the wheel largely with green sand molds. The structure is also one which in cooling will not set up objectionable strains, which would diminish the strength of the wheel.

What I claim as my invention is:—

1. A cast vehicle wheel, comprising a hollow rim, a hub, radial spokes of solid section comparatively narrow in the plane of the wheel, wide in the plane of the axis and tapering from the central plane to the opposite sides extending between and formed integral with said hub and rim, a portion of the metal at the point of intersection at one end of the spoke being cut away to reduce the mass and avoid strains.

2. A cast vehicle wheel, comprising a hub, a hollow rim and a series of spokes extending between said hub and rim and integral therewith, said spokes being of a cross-section comparatively narrow in the plane of the wheel, wide in the plane of the axis, and tapering from the central plane to the opposite sides, the central portion of the spoke adjacent to the point of intersection with the rim being cut away to reduce the mass of metal and avoid strains.

3. A cast vehicle wheel, comprising a hub, a hollow rim and spokes extending radially between said hub and rim and integral therewith, said spokes being of a solid cross-section comparatively narrow in the plane of the wheel, wide in the plane of the axis, being also of a tapering form from the central plane toward the opposite sides, and a brace web extending diagonally from the outer end portions of said spokes to the rim, the metal at the center of the spoke and brace adjacent to the rim being cut away to reduce the mass and avoid strains.

4. A cast vehicle wheel, comprising a hub, a hollow rim and a series of radial spokes extending between said hub and rim and integral therewith, said rim having its inner wall flaring outwardly from the central plane of the wheel toward the opposite sides thereof, said spokes being of a solid cross-section comparatively narrow in the plane of the wheel and wide in the plane of the axis and tapering from the central plane toward the opposite sides, and diagonal brace webs extending from the spoke to the rim, the metal at the center of the spoke and brace adjacent to said rim being cut away to reduce the mass and avoid strains.

In testimony whereof I affix my signature.

WALTER S. ALLEN.